United States Patent
Ueda et al.

[11] Patent Number: 6,056,477
[45] Date of Patent: May 2, 2000

[54] WASTE DISPOSAL SITE

[75] Inventors: Shigeo Ueda, Yokohama; Osamu Imabayashi, Shiga-ken, both of Japan

[73] Assignee: Taiyo Kogyo Corporation, Osaka, Japan

[21] Appl. No.: 09/080,375

[22] Filed: May 12, 1998

[30] Foreign Application Priority Data

Jul. 29, 1997 [JP] Japan .................................. 9-203112
Oct. 9, 1997 [JP] Japan .................................. 9-276922

[51] Int. Cl.$^7$ ...................................................... B09B 1/00
[52] U.S. Cl. ........................... 405/54; 73/49.2; 340/605; 405/128; 405/129; 588/260
[58] Field of Search .................... 73/49.2, 49.3; 210/901; 340/605; 405/52, 53, 54, 128, 129; 588/249, 259, 260

[56] References Cited

U.S. PATENT DOCUMENTS

| | | | |
|---|---|---|---|
| 4,344,722 | 8/1982 | Blais | 405/270 |
| 4,404,516 | 9/1983 | Johnson, Jr. | 405/52 X |
| 4,753,551 | 6/1988 | Brueggemann et al. | 405/54 X |
| 4,947,470 | 8/1990 | Darilek | 405/128 X |
| 5,288,168 | 2/1994 | Spencer | 405/54 |
| 5,357,202 | 10/1994 | Henderson | 405/54 X |
| 5,362,182 | 11/1994 | Hergenrother | 405/129 |
| 5,540,085 | 7/1996 | Sakata et al. | 340/605 X |
| 5,690,448 | 11/1997 | Fasullo et al. | 405/129 |
| 5,905,184 | 5/1999 | Carter, Jr. | 588/260 |

Primary Examiner—George Suchfield
Attorney, Agent, or Firm—Jordan and Hamburg LLP

[57] ABSTRACT

A waste disposal site according to the present invention is provided with water-impermeable properties by water-impermeable materials covering a bottom surface and a sloped side surface of the waste disposal site. The waste disposal site is provided with a water-impermeable material damage-detecting system comprising electrodes for feeding electricity disposed above and below the water-impermeable materials for forming an electric field, and electrodes for measurement disposed along the water-impermeable materials. The system allows for detection of damages to the water-impermeable materials based on a potential variation at a damaged portion thereof. In the waste disposal site, a surface of the water-impermeable material on the sloped side surface is provided with water-retentive cover layers through a planting material or by employing an artificial material, and an electric field is formed inside the cover layer to allow any damages to the water-impermeable materials on the sloped side surface to be detected.

17 Claims, 3 Drawing Sheets

WASTE DISPOSAL SITE

BACKGROUND OF THE INVENTION

1. Field of the Invention

The present invention relates to a waste disposal site, more particularly to a waste disposal site equipped with a water-impermeable material damage-detecting system which is capable of detecting damages to liner or water-impermeable materials employed at the site.

2. Description of Related Art

A waste disposal site is generally formed by digging the ground to a certain appropriate depth, and waste substances are reclaimed in sequence from the bottom of the dug ground. In such a waste disposal site, water-impermeable materials are usually applied to a bottom and a sloped side surface of the disposal site in order to prevent wastewater from diffusing to ambient earth or ground. As a water-impermeable material, synthetic resin sheets or rubber sheets which both have excellent electric-insulating properties are generally used. It should be noted there is a danger that such water-impermeable materials are subject to damages during a construction work of a waste disposal site or during filling of waste substances. There is a further danger that the water-impermeable materials are subject to damages by birds or beasts trespassing on the waste disposal site. Even if such damages are small, they allow waste water in the waste disposal site to leak out, thereby spoil an object of a seepage control. For that reason, a water-impermeable material damage-detecting system is installed to detect occurrence and parts of damage for a quicker treatment such as a repair work.

The water-impermeable material damage-detecting system is an application of an electric exploration technology which, for instance employs bipolar- or tripolar system (see Japanese Patent Publication No. 63901/1994). More particularly, damages to the water-impermeable materials are detected through varied distribution of potential in electric fields formed above and below the water-impermeable materials via electrodes for feed. Specifically speaking, if the water-impermeable materials of electric-insulation properties are damaged under a condition where electric fields are applied above and below the water-impermeable materials, water leakage or the like occurred there will entail electrical current flow, and ambient potential will vary accordingly. The potential variation there is detected via electrodes for measurement disposed in a reticular manner to determine if damage has occurred and to locate the damaged area.

As will be apparent from the above described principles, in a electric water-impermeable material damage-detecting system, electrically-conductive layers covering an entire surface of the water-impermeable materials need to be applied both above and below the water-impermeable materials. Normally, the electrically-conductive layers are provided by the ground of the waste disposal site with respect to below the water-impermeable materials, and are provided by cover soil which covers the water-impermeable materials for protecting water-impermeable materials with respect to above the water-impermeable materials. However, when the sloped side surface must be steep for the purpose of securing site or the like, it is actually difficult to preliminarily apply cover soil to the sloped side surface, so that any electrically-conductive layer or layers cannot be secured before waste are piled thereon. Therefore, an examination for water-impermeable properties required after completion of a waste disposal site cannot be fully conducted with respect to the sloped side surface. Additionally, an examination for water-impermeable properties required during operation of a waste disposal site cannot be fully conducted with respect to the sloped side surface which would still be exposed.

If dual water-impermeable materials are applied, another problem will be raised as to the electrically-conductive layers. When the water-impermeable materials are made dual in structure, it is general to apply cover soil between upper and lower water-impermeable materials to render the cover soil to be an electrically-conductive layer. Therefore, a similar problem to the above as applied to the sloped side surface will be raised. Namely, a steep sloped side surface will make it difficult to apply cover soil to the sloped side surface. Another problem is that cover soil will reduce an effective volume of the waste disposal site. More particularly, cover soil is applied by means of such heavy duty vehicles including a bulldozer, and in order to avoid damages to the water impermeable materials done by the heavy duty vehicles, the cover soil layer needs to have a thickness of approximately 50 to 100 cm. However, such a thickness will reduce the effective volume to a considerable extent. As yet another problem, there is a danger that the electrodes for measurement disposed in a reticular manner may be disordered due to a soil covering work. More particularly, the electrodes for measuring is generally disposed in a reticular manner with an accuracy to a level of centimeters, however such disposition with greater accuracy may be adversely effected by the cover soil to be smoothed by a bulldozer in a soil covering work.

SUMMARY OF THE INVENTION

The present invention has been made noting the circumstances, and it is therefore an object of the present invention to provide a waste disposal site where a water-impermeable material damage-detecting system can be effectively operated even when a sloped side surface is very steep. It is another object of the invention to provide a waste disposal site where an effective volume is not reduced or disposition of electrodes for measurement is not disordered, even when water-impermeable materials are dually applied.

The waste disposal site according to the present invention is provided with water-impermeable properties by water-impermeable materials covering a bottom surface and a sloped side surface of the waste disposal site, and basically has a structure including a water-impermeable material damage-detecting system. The system comprises electrodes for feed which are disposed above and below the water-impermeable materials for forming an electric field, and electrodes for measurement disposed below the water-impermeable materials. The system allows for detection of damages to the water-impermeable materials based on a potential variation at a damaged portion thereof. Thus, the waste disposal site is characterized in that a cover layer having water retention characteristics obtained by a planting material or an artificial material are provided on the surface of the water-impermeable materials, and electric fields are formed below the cover layer to allow any damages to the water-impermeable materials at the sloped side surface to be detected.

An example of forming the cover layer by a planting material is planting a plant such as turf of which roots intertwine with one another to present a mat-like appearance. On the other hand, examples of forming the cover layer by an artificial material are a coconut palm mat made of coconut fiber, a nonwoven fabric, a synthetic resin mat or the like having water retention characteristics or water absorption properties. A cover layer, formed by the plant, the mat, or the fabric can sufficiently and stably cover even a steep sloped side surface, and even if particular care is not taken nor water is sprinkled when needed, the electric conductivity for electric fields required for detecting operation using the water-impermeable material damage-detecting system can be sufficiently maintained. Therefore, even if a sloped side surface is steep, the water-impermeable material damage-detecting system can be effectively operated.

The other type of waste disposal site according to the present invention is basically structured to have a water-impermeable material damage-detecting system in which is provided an interior surface dually covered with upper and lower water-impermeable materials for providing water-impermeable properties, an electrode for feeding electricity disposed to form electric fields above and below the water-impermeable materials, and electrodes for measurement disposed between the upper and lower water-impermeable materials, thereby allowing any damage to each water-impermeable material to be detected based on a potential variation at any damaged portion made on each respective water-impermeable material. The waste disposal site is characterized by an electrically-conductive layer made of an artificial material provided between the upper and lower water-impermeable materials.

Typical examples of the artificial materials for an electrically-conductive layer are sheet materials, net materials, and mat materials, which all have appropriate electric resistance. As sheet materials, synthetic resin sheets provided with electric-conductivity by mixing conductive-material powder, such as carbon powder and aluminum powder, can be employed. As net materials, such materials made of synthetic resin having identical compositions as the above can be employed. As mat materials, nonwoven fabric or coconut palm mat which have carbon fibers or aluminum fibers mixed therein, or electric-conductive sheets as described above incorporated therein, can be employed.

Such an electrically-conductive layer can be provided on a steep sloped side surface fully and stably. Therefore, the water-impermeable material damage-detecting system can effectively operate even if a sloped side surface is steep. The electrically-conductive layer can be made of a thickness of a few millimeters when sheet materials or net materials are used, and also be made of a thickness of between several and a dozen or so centimeters when mat materials are used. Therefore, an effective volume of the waste disposal site is not substantially influenced. Further, such an electrically-conductive layer can be formed by spreading sheet materials, net materials or mat materials, so that disposition of electrodes for measurement is not disordered during a soil-covering work.

It is preferable if the electrically-conductive layer as described above is combined with a function for discharging water permeated between the upper and lower water-impermeable materials. For achieving that purpose, water permeability required for moving water for being discharged should be provided to the electrically-conductive layer or at least a water-permeable layer having water permeability as described above should be combined with the electrically-conductive layer.

As has been discussed above, according to the present invention, the water-impermeable material damage-detecting system can effectively operate even when a sloped side surface is very steep. In a case where the water-impermeable materials are dually applied, an effective volume of the waste disposal site will not be reduced nor disposition of electrodes for measurement will be disordered, thereby improving the functionality of the waste disposal site.

The present invention is not limited to the above description, and its objects, advantages, features, and applications will become more apparent from the following description in conjunction with the accompanying drawings. It should be understood that changes and modifications are possible without departing from the spirit and scope of the invention.

DETAILED DESCRIPTION OF THE PREFERRED EMBODIMENT

Figure 1:
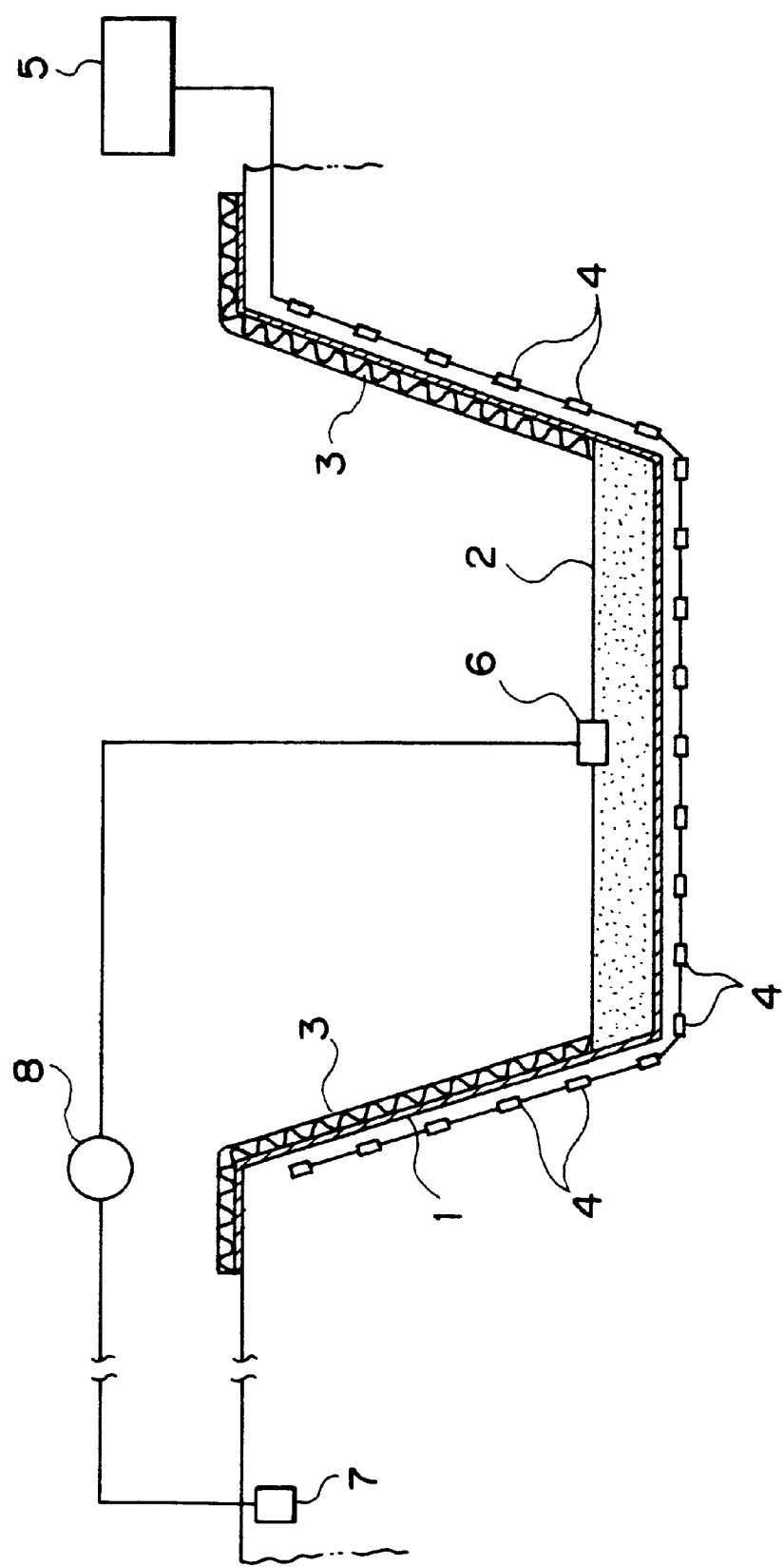
FIG. 1 is a schematic, cross-sectional view of a waste disposal site according to a first embodiment of the present invention.

First Embodiment:

A waste disposal site according to a first embodiment of the present invention is schematically illustrated in FIG. 1. As seen in FIG. 1, the waste disposal site is formed as a cavity, which has been dug to a depth between several and a dozen or so meters from ground surface. A bottom surface and a sloped side surface are all provided with a water-impermeable layer which is to be formed by spreading all over the bottom surface and the sloped side surface a nonwoven fabric over which subsequently an electrically insulative water-impermeable sheet I made of synthetic resin or rubber is spread. Over the water-impermeable sheet 1, cover layers 2,3 are to be provided. The cover layer 2 provided on the bottom is formed to have a thickness of, for example, about 50 cm by cover soil in which earth is employed. On the other hand, the other cover layer 3 provided on the sloped side surface is formed to have a thickness of, for example, about 10 cm by planting turf or by spreading all over the cover layer 3 a palm mat, a nonwoven fabric, a synthetic resin mat or the like with water retention characteristics. It is preferable if water is sprinkled over the cover layer 3 at need by utilizing any sprinkling facility which is normally installed at a waste disposal site for holding down dust.

A damage-detecting system is provided with respect to the water-impermeable sheet 1. The damage-detecting system according to the embodiment adopts a tripolar system and comprises a measuring system and an electric-feeding system. The measuring system comprises a plurality of electrodes 4 for measurement disposed below the water-impermeable sheet 1 in a reticular manner, and a processing device 5 for processing signals transmitted from each electrode 4. The electric-feeding system comprises an electrode 6 for feeding electricity to be installed inside the waste disposal site, an electrode 7 for feeding electricity to be installed outside the waste disposal site, and a constant current power supply 8.

In a waste disposal site thus structured, for inspecting the water-impermeable sheet 1 for a presence or absence of damages thereto for example upon completion of the waste disposal site, the electrode 6 is brought into contact with the cover layer 2 to supply electric current from the constant current power supply 8 to the electrodes 6,7. Damages to the insulative water-impermeable sheet 1 will allow water leakage which also entails electric current flow, so that an ambient potential varies. The potential difference is transmitted to the processing device via the electrodes 4 for measurement. The processing device 5 analyzes the signals from the electrodes 4 for measurement based on a predetermined program to locate a varied portion of potential, namely a damaged portion on the water-impermeable sheet 1.

Figure 2:
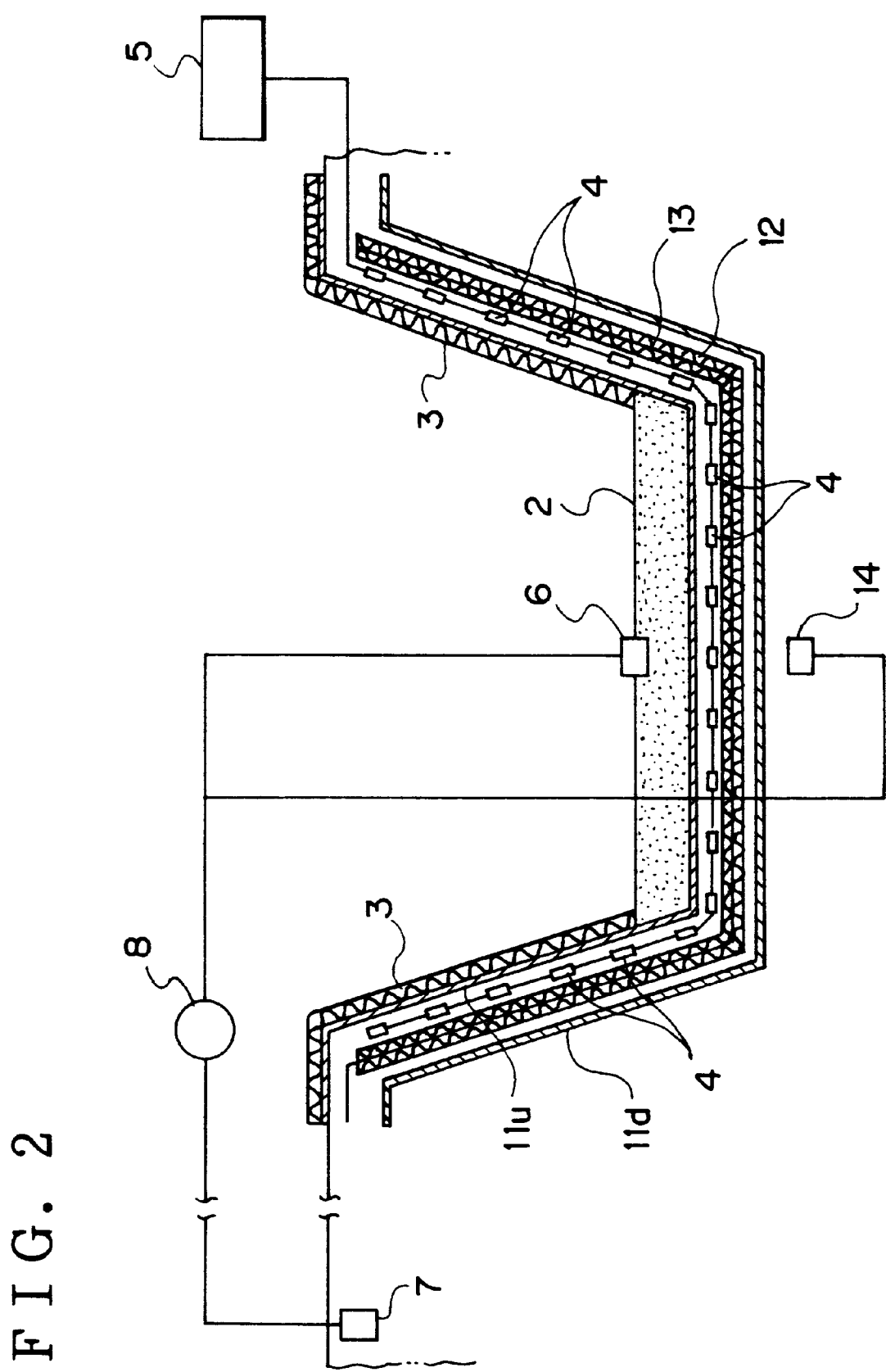
FIG. 2 is a schematic, cross-sectional view of a waste disposal site according to a second embodiment of the present invention.

Second Embodiment:

In a waste disposal site according to a second embodiment of the present invention, the water-impermeable layer has as illustrated in FIG. 2 a dual structure comprising a lower water-impermeable sheet 11d and an upper water-impermeable sheet 11u. With the structure, the damage-detecting system is adapted to detect any damage to the respective water-impermeable sheets 11d,11u. Specifically, electrodes 4 for measurement similar to that in the First Embodiment are disposed between the lower water-impermeable sheet 11d and the upper water-impermeable sheet 11u. Further, an electrically-conductive layer 12 made of an artificial material is provided along the electrodes 4 for measurement. The electrically-conductive layer 12 can be formed by a material, such as a nonwoven fabric, a palm mat, and the like, by which either sheet-like or reticular electrically-conductive material 13 is to be sandwiched. As an electric-feeding system, an electrode 14 for feed for the lower water-impermeable sheet 11d is further provided in addition to electrodes 6,7 which are similar to those in the First Embodiment.

Damage detection of the water-impermeable sheets in the thus structured waste disposal site is basically carried out in a similar manner to the First Embodiment. It should be noted that, however, the lower water-impermeable sheet 11d and the upper water-impermeable sheet 11u are independently inspected for detection. To accomplish the detection, the electrodes 6,14 are selectively used.

Figure 3:
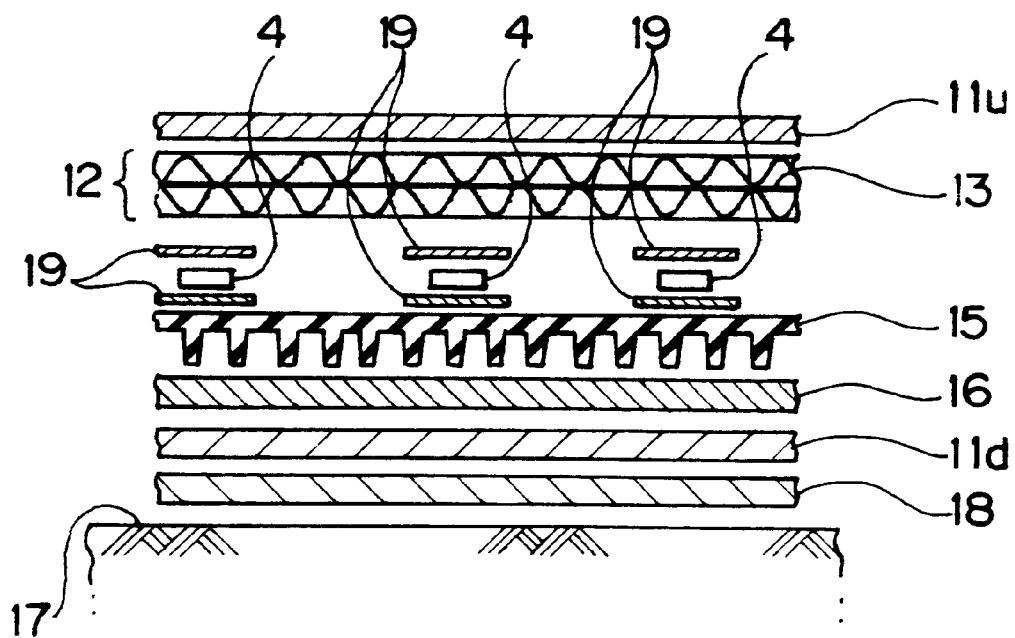
FIG. 3 is a cross-sectional view schematically illustrating a bottom portion of a waste disposal site according to a third embodiment of the present invention.

Third Embodiment:

A waste disposal site according to a third embodiment of the present invention is as illustrated in FIG. 3, which shows an enlarged cross-sectional view of the bottom portion of the waste disposal site. It should be noted that the sloped side surface of the waste disposal site is adapted to have a similar structure to the bottom surface. The waste disposal site according to the third embodiment also has a water-impermeable layer formed to have a dual structure comprising a lower water-impermeable sheet 11d, an upper water-impermeable sheet 11u, and an electrically-conductive layer 12 and electrodes 4 for measurement in which both 12, 4 are disposed between the water-impermeable sheets 11d, 11u.

In the waste disposal site, a drainage layer 15 is provided between the layer 12 and the lower water-impermeable sheet 11d. The drainage layer 15 consists of a hard rubber sheet or the like provided with concavities and convexities, and gaps formed between the concavities and convexities act as a drain gutter or passage for removing drainage or wastewater collected between the water-impermeable sheets 11d, 11u by a draining means (not shown). In this embodiment, a protection layer 16 comprising a nonwoven fabric or the like is disposed between the drainage layer 15 and the lower water-impermeable sheet 11d in order to protect the lower water-impermeable sheet 11d against the drainage layer 15. Further, in the waste disposal site according to the Third Embodiment, another protection layer 18 comprising nonwoven fabric is disposed also between the lower water-impermeable sheet 11d and a ground surface 17, and acts as a protector of the lower water-impermeable sheet 11d. In this embodiment, the electrodes 4 for measurement are sandwiched at the top and bottom thereof between electrode-protection materials 19, which are made of nonwoven fabric or the like and aim to prevent the lower water-impermeable sheet 11d from being broken by the electrodes 4 for measurement.

It should be noted that although the Third Embodiment discloses that the electrodes 4 for measurement sandwiched between the electrode-protection materials 19 are disposed between the drainage layer 15 and the layer 12, the electrodes 4 for measurement may be positioned at any other appropriate or convenient place in accordance with, for example, conditions for constructing process of a waste disposal site. For example, the electrodes 4 for measurement sandwiched between the electrode-protection materials 19 can be disposed between layer 12 and the upper water-impermeable sheet 11 u or between the protection layer 16 and the lower water-impermeable sheet 11d.

What is claimed is:

1. A waste disposal site comprising:
    a bottom surface having a water-impermeable material covering;
    at least one sloped side surface having a water-impermeable material covering wherein a surface of said water-impermeable material covering of said sloped side surface is provided with a water retentive or absorptive cover layer in the form of a layer of plants rooted in soil or an artificial material; and
    water-impermeable material damage-detecting means comprising electrodes for feeding electricity being disposed on opposite sides of said water-impermeable material coverings thereby forming an electric field about said water-impermeable material coverings, and electrodes for measuring damage to said water-impermeable material coverings being disposed along the water-impermeable material coverings whereby damage to a portion of either of said water-impermeable material coverings is detectable based on an electrical potential variation at said damaged portion when said damage occurs.

2. The waste disposal site according to claim 1, wherein said water-impermeable material damage-detecting means further comprises a current power supply in communication with said feeding electrodes and a processing device for processing signals from said measurement electrodes.

3. The waste disposal site according to claim 1, wherein a surface of said water-impermeable material covering of said bottom surface of said waste disposal site is provided with a water retentive or absorptive cover layer in the form of a layer of plants rooted in soil or an artificial material.

4. The waste disposal site according to claim 1, wherein said cover layers are of one piece construction.

5. The waste disposal site according to claim 1, wherein said at least one sloped side surface is steep.

6. A waste disposal site comprising:
    an interior surface being dually covered with a first water-impermeable material covering and a second water-impermeable material covering;
    a water-impermeable material damage-detecting means comprising electrodes for feeding electricity being disposed on opposite sides of said water-impermeable material coverings thereby forming an electric field about said water-impermeable material coverings, and electrodes for measuring damage to said water-impermeable material coverings being disposed along the water-impermeable material coverings whereby damage to a portion of either of said water-impermeable material coverings is detectable based on an electrical potential variation at said damaged portion when said damage occurs; and an electrically-conductive layer being provided between said water-impermeable material coverings and being made of an artificial material.

7. The waste disposal site according to claim 6, wherein said interior surface is a bottom surface.

8. The waste disposal site according to claim 6, wherein said interior surface is at least one sloped side surface.

9. The waste disposal site according to claim 8, wherein said at least one sloped side surface is steep.

10. The waste disposal site according to claim 6, wherein said interior surface is a bottom surface and at least one sloped side surface wherein each of said bottom surface and of said at least one sloped side surface is dually covered with a respective water-impermeable material covering of said water-impermeable material coverings.

11. The waste disposal site according to claim 6, wherein said water-impermeable material damage-detecting means further comprises a current power supply in communication with said feeding electrodes and a processing device for processing signals from said measurement electrodes.

12. The waste disposal site according to claim 11, wherein said electric-feeding system further comprises at least one second feeding electrode being positioned outside of said site and in communication with said current power supply.

13. The waste disposal site according to claim 6, wherein a surface of said water-impermeable material covering of said interior surface is provided with at least one water retentive or absorptive cover layer in the form of a layer of plants rooted in soil or an artificial material.

14. The waste disposal site according to claim 13, wherein said electrodes for feeding electricity are in contact with said cover layer.

15. The waste disposal site according to claim 6, further comprising a drainage layer for removing fluids collected between said water-impermeable material coverings wherein said drainage layer is disposed between said electrically-conductive layer and one of said water-impermeable material coverings that is closest to a surface of a location where said waste disposal site is located.

16. The waste disposal site according to claim 15, further comprising a first protective layer disposed between said drainage layer and said one of said water-impermeable material coverings that is closest to a surface of a location.

17. The waste disposal site according to claim 16, further comprising a second protective layer disposed between said surface of said location and said one of said water-impermeable material coverings that is closest to a surface of a location, wherein said electrodes for measuring damage are positioned between said protective layers.

* * * * *